(12) United States Patent
Karlsen et al.

(10) Patent No.: US 10,958,630 B2
(45) Date of Patent: Mar. 23, 2021

(54) SYSTEM AND METHOD FOR SECURELY EXCHANGING DATA BETWEEN DEVICES

(71) Applicants: Geir Christian Karlsen, Yven (NO); Boris Vujicic, Belgrade (RS)

(72) Inventors: Geir Christian Karlsen, Yven (NO); Boris Vujicic, Belgrade (RS)

( * ) Notice: Subject to any disclaimer, the term of this patent is extended or adjusted under 35 U.S.C. 154(b) by 394 days.

(21) Appl. No.: 16/078,371

(22) PCT Filed: Feb. 21, 2017

(86) PCT No.: PCT/IB2017/050983
§ 371 (c)(1),
(2) Date: Aug. 21, 2018

(87) PCT Pub. No.: WO2017/141229
PCT Pub. Date: Aug. 24, 2017

(65) Prior Publication Data
US 2019/0052613 A1    Feb. 14, 2019

Related U.S. Application Data

(60) Provisional application No. 62/297,899, filed on Feb. 21, 2016.

(51) Int. Cl.
*H04L 29/06* (2006.01)
*G06F 21/00* (2013.01)
(Continued)

(52) U.S. Cl.
CPC ........ *H04L 63/0478* (2013.01); *G06F 16/178* (2019.01); *H04L 9/0894* (2013.01); *H04L 9/14* (2013.01); *H04L 9/3073* (2013.01); *H04L 9/3226* (2013.01); *H04L 63/0442* (2013.01); *H04L 63/062* (2013.01)

(58) Field of Classification Search
CPC .............. H04L 63/0478; H04L 63/062; H04L 63/0442; H04L 9/0894; H04L 9/3073; H04L 9/3226; H04L 9/14; G06F 16/178
See application file for complete search history.

(56) References Cited

U.S. PATENT DOCUMENTS

2002/0095568 A1    7/2002   Norris et al.
2006/0129847 A1*   6/2006   Pitsos ................... H04L 9/3236
                                                            713/193
(Continued)

FOREIGN PATENT DOCUMENTS

KR     20180052414 A   *   5/2018

OTHER PUBLICATIONS

European Patent Application No. 17 713 435.0, Communication pursuant to Article 94(3) EPC dated Jul. 10, 2020, 8 pages.
(Continued)

*Primary Examiner* — Lisa C Lewis
(74) *Attorney, Agent, or Firm* — Lathrop GPM LLP

(57) ABSTRACT

An approach to exchanging data and identity between devices, securely, is provided. The approach includes data encryption, device management, a voting mechanism, message queuing, and encrypted data storing. Using the approach, a user can provide their identity to and share data with an external software or device in a secure manner. Also the user can decide where to store their encrypted data.

17 Claims, 4 Drawing Sheets

(51) Int. Cl.
*H04L 9/14* (2006.01)
*G06F 16/178* (2019.01)
*H04L 9/08* (2006.01)
*H04L 9/30* (2006.01)
*H04L 9/32* (2006.01)

(56) References Cited

U.S. PATENT DOCUMENTS

2012/0310840 A1\* 12/2012 Colombo ............ G06Q 20/385
  705/73
2015/0207784 A1 7/2015 Jevans
2015/0312759 A1 10/2015 Kim et al.
2020/0186505 A1\* 6/2020 Amar .................. H04L 63/0435

OTHER PUBLICATIONS

International Search Report and Written Opinion of PCT/IB2017/050983 dated May 9, 2017, 2 pp.
European Patent Application No. 17713435.0, Communication pursuant to Article 94(3) EPC dated Sep. 10, 2019, 5 pages.

\* cited by examiner

SYSTEM AND METHOD FOR SECURELY EXCHANGING DATA BETWEEN DEVICES

RELATED APPLICATIONS

This application claims priority to U.S. Provisional Patent Application No. 62/297,899, filed Feb. 21, 2016, which is incorporated by reference in its entirety herewith.

BACKGROUND

Identity theft has become an important concern. A significant contributing factor is that an individual's social security number and other confidential identifying data are required on many application forms. As a result, individuals may lose control over what is applied for in their names. Particularly with the growth of the Internet, the opportunity exists for a person to represent himself or herself, improperly and without authorization, as another person. This may be done, for instance, to make purchases, to obtain credit or debit cards, or for other purposes. This misrepresentation may be done by using, for example, a stolen social security number or bank account number or other confidential, personal identifying number.

SUMMARY

An example of a method for exchanging data and identity between devices, securely, includes registering a first device with a device access manager, which includes one or more device public keys. The method further includes encrypting a data synchronization request for the one or more device public keys to synchronize data with second devices. The method further includes encrypting the data with the one or more device public keys to form a device public encrypted file (DPEF) for each of the second devices. The method further includes encrypting the DPEF's for each of the second devices with a manager public key to form an encrypted message for synchronizing the data among the first and second devices.

In some examples of the method, the first device is an application acting as a device.

In other examples of the method, the data is encrypted in accordance to a cryptography technique selected from the group consisting of Digital Signature Algorithm (DSA), RSA, and Elliptic Curve Digital Signature Algorithm (ECDSA).

In some examples of the method, the data synchronization request is encrypted with the manager public key.

Some examples of the method further include encrypting the data with a first private key of the first device to form a device data encrypted file (DDEF) and storing the DDEF in a data store. The data store is external to the first device and includes the data encrypted with one or more second private keys.

Other examples of the method further include signing the encrypted data synchronization request with a digital certificate of the first device. The digital certificate authenticating the identity of the first device.

Another example of a method for exchanging data and identity between devices, securely, includes in a device access manager including one or more device public keys, registering a first device. The method further includes decrypting a data synchronization request for the one or more device public keys to synchronize data with second devices. The method further includes providing the device public keys to the first device. Doing so allows the first device encrypts the data with the one or more device public keys to form a device public encrypted file (DPEF) for each of the second devices. The method further includes decrypting first encrypted messages to reveal the DPEF's for each of the second devices. The method further includes encrypting the DPEF's with the one or more device public keys to form second encrypted messages. The method further includes generating a message queue with the second encrypted messages for synchronizing the data among the first and second devices.

In some examples of the method, registering the first device includes providing credentials to the first device and decrypting a registration request from the first device. The registration request includes the credentials and a first device public key, and is encrypted with the manager public key. The first device public key is stored in the device access manager.

Yet another example of a method for exchanging data and identity between devices, securely, includes registering a first device with a device access manager. The first device includes a device public key. The method further includes encrypting a data sharing request for the device public key to share data with a second device. The method further includes encrypting the data with the device public key to form a device public encrypted file (DPEF) for the second device. The method further includes encrypting the DPEF with a manager public key to form an encrypted message for sharing the data with the second device.

Still yet another example of a method for exchanging data and identity between devices, securely, includes in a device access manager including a device public key, registering a first device. The method further includes decrypting a data sharing request for the device public key to share data with a second device. The method further includes providing the device public key to the first device. Doing so allows the first device to encrypt the data with the device public key to form a device public encrypted file (DPEF) for the second device. The method further includes decrypting a first encrypted message to reveal the DPEF for the second device. The method further includes encrypting the DPEF with the device public key to form a second encrypted message. The method further includes generating a message queue with the second encrypted message for sharing the data with the second device.

An example of a system for exchanging data and identity between devices, securely, includes a device access manager including a manager public key and one or more device public keys. The system further includes a first device communicatively coupled to the device access manager. The system further includes one or more second devices communicatively coupled to the device access manager. The first device is configured to encrypt a data synchronization request for one or more device public keys to synchronize data, encrypt data with the one or more device public keys to form a device public encrypted file (DPEF) for each of the second devices, and encrypt the DPEF's with the manager public key to form a first encrypted message for each of the second devices. The device access manager is configured to decrypt the data synchronization request, provide the one or more device public keys, decrypting the first encrypted messages to reveal the DPEF's for each of the second devices, encrypt the DPEF's with the device public keys to form second encrypted messages, and generate a message queue with the second encrypted messages. The second devices are configured to listen to the message queue for the second encrypted messages, decrypt the second encrypted messages, and decrypt the DPEF's to reveal the data for each of the second devices, thereby synchronizing the data among the first and second devices.

An example of a device access manager for securely exchanging data and identity between devices include a registration engine for registering devices and a registry communicatively coupled to the registration engine for holding device public keys of registered devices. The device access manager further includes a decryption engine communicatively coupled to the registry. The decryption engine is for decrypting a data synchronization request for one or more device public keys to synchronize data with the registered devices. Additionally, the decryption engine is for decrypting first encrypted messages to reveal a device public encrypted file (DPEF) for each of the registered devices. The device access manager further includes an encryption engine communicatively coupled to the decryption engine. The encryption engine is for encrypting the DPEF's with the one or more device public keys to form second encrypted messages. The device access manager further includes a message queue communicatively coupled to the encryption engine. The message queue includes the second encrypted messages for synchronizing the data among the registered devices.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

It is common for a user to use an application on multiple devices, such as their smartphone and computer. Some applications require the user to provide their username and password or other application credential to log into the application. So that the user does not have to enter their application credential each time they use the application, as a convenience, the user can elect to the have the smartphone and the computer "remember" the application credential. The smartphone and computer store the user's application credential locally i.e., in smartphone memory and computer memory. There are several problems with this approach. For example, when the user changes the application credential on their smartphone, those changes are not propagated to the computer, automatically. The user must make the same changes, manually, on the computer. This approach is even more problematic when the user has several devices, all of which need to be updated.

Another problem is the lack of security. If the smartphone or computer is hacked, not only is the application credential compromised but other locally stored credentials are compromised as well. Matters are made even worse because passwords are commonly stored in devices in plain text. Accordingly, there is a need to be able to share encrypted data between devices, authorize and authenticate identities, providing secure identity exchange, and to provide seamless authentication process with other software.

Figure 1:
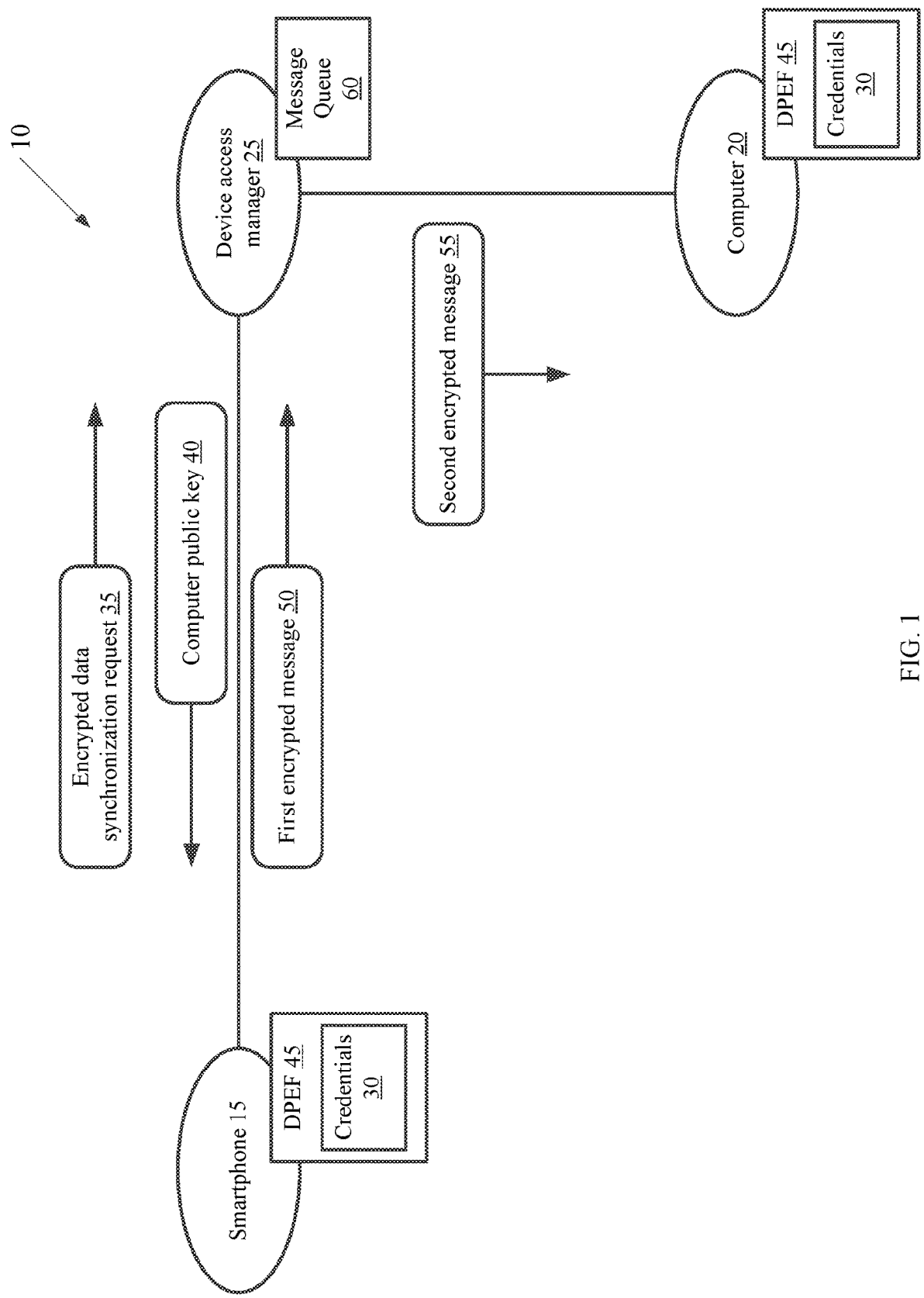
FIG. 1 is a diagram of synchronizing application credentials among a smartphone and a computer using an approach for exchanging data and identity between devices, securely, in an embodiment.

FIG. 1 shows a network 10 with a smartphone 15, a computer 20, and a device access manager 25 communicatively coupled as shown. The smartphone 15 and the computer 20 synchronize application credentials 30 using an approach for securely exchanging data and identity between devices. The smartphone 15, the computer 20, and the device access manager 25 each have a public private key pair. The public keys are used to encrypt data like the application credentials 30, while the private keys are used to decrypt data. Through a registration process (described later in greater detail), the smartphone 15 provides a smartphone public key and the computer 20 provides a computer public key 40 to the device access manager 25. Maintaining only device public keys used to encrypt data on the device access manager 25 is advantageous because even if the device access manager 25 is hacked, the security of the devices is not comprised. To further enhance security, the smartphone 15 and the computer 20 encrypt messages sent to the device access manager 25 with a manager public key.

To synchronize the application credentials 30 among the smartphone 15 and the computer 20 in a secure manner, the smartphone 15 uses a data synchronization request to ask for the computer public key 40. The smartphone 15 encrypts the data synchronization request with the manager public key to form an encrypted data synchronization request 35 and sends it to the device access manager 25. The device access manager 25 decrypts the encrypted data synchronization request 35 with its private key. The device access manager 25 responds to the request by sending the computer public key 40 to the smartphone 15.

With the computer public key 40, the smartphone 15 encrypts the application credentials 30 to form a device public encrypted file (DPEF) 45. The smartphone 15 encrypts the DPEF 45 again with the manager public key to form a first encrypted message 50. Encrypting data sent to the device access manager 25 a second time is advantageous because even if the device access manager 25 is hacked (e.g., its private key is comprised), the DPEF 45 is still encrypted. Decrypting the DPEF 45 requires the private key of the intended device, which in this example is the computer 20. The device access manager 25 receives the first encrypted message 50 and decrypts it with its private key. The device access manager 25 then encrypts DPEF 45 with the computer public key 40 to form a second encrypted message 55.

The second encrypted message 55 is in a message queue 60. The computer 20 queries the message queue 60 for message(s) that are intended for it. The computer 20 decrypts the second encrypted message 55 with its private key to reveal the DPEF 45. The computer 20 decrypts DPEF 45, again with its private key, to reveal the application credentials 30, which it can then use to login into an application, automatically. With the application credentials 30 being synchronized in this manner, changes to the application credentials 30 are readily and securely propagated to the smartphone 15, the computer 20, and any other devices for that matter.

The aforementioned approach for exchanging data and identity between devices, securely, includes a registration process 200, a data synchronization process 300, and a data sharing process 400. Each of these processes is described below in turn.

Figure 2:
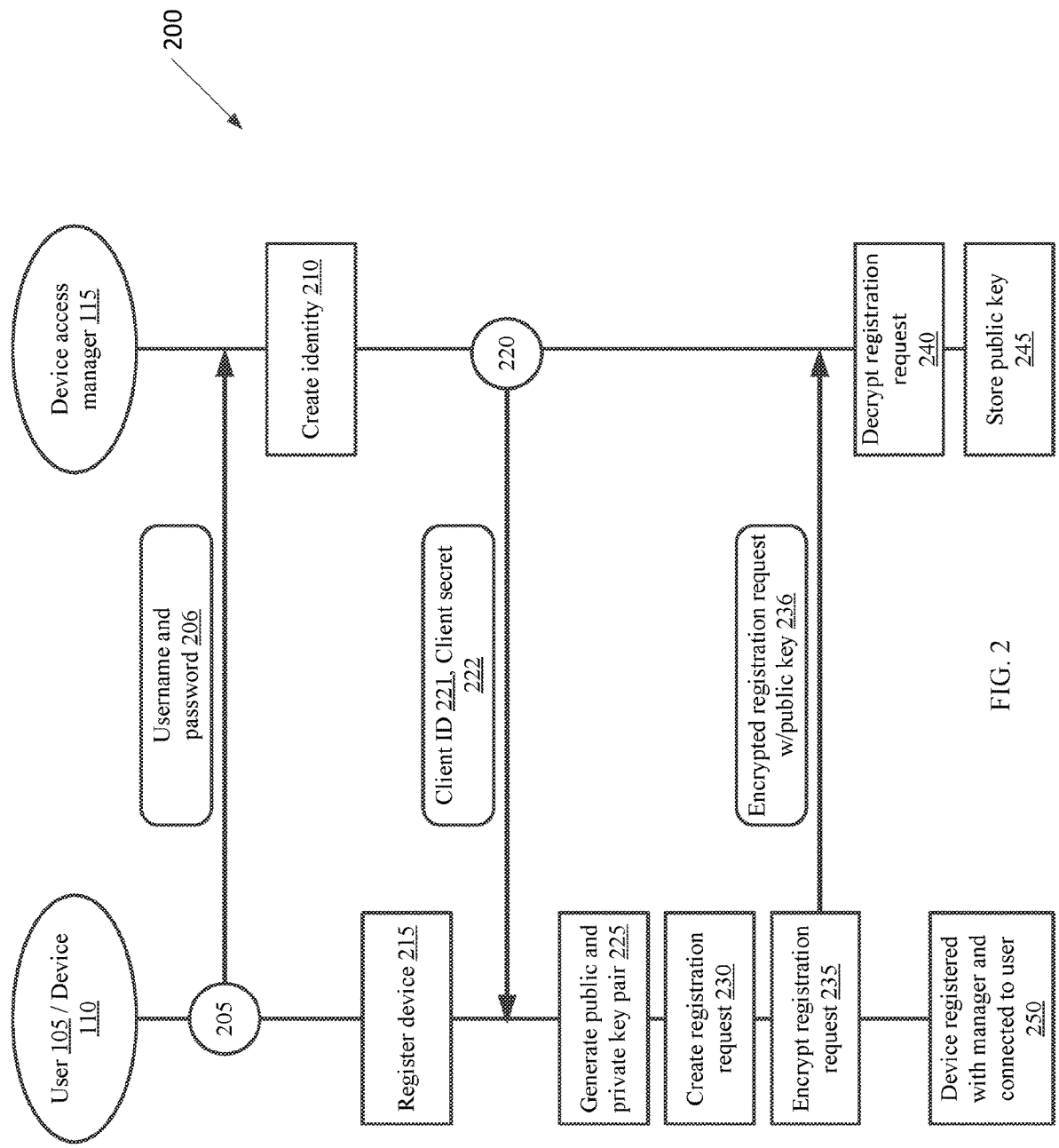
FIG. 2 is a diagram of an example of a registration process, in an embodiment.

FIG. 2 shows an example of the registration process 200 in which a user 105 is connected to a device 110 that is registered with a device access manager 115. At 205, the user 105 registers with the device access manager 115 by providing a username and password 206. Other user information are also contemplated such as, first name, last name, gender, phone number, and country. Some examples of the device access manager 115 provide additional security checks, such as two-step verification, pin number, etc. At 210, the device access manager 115 creates an identity (or user profile) for the user 105. As such, it can be said that the user has a user identity in the device access manager 115.

At 215, the user 105 registers the device 110 with the device access manager 115 under their identity. In some examples, the user 105 registers the device 110 by scanning a quick response (QR) code or through a manager application program interface (API). In response, at 220, the device access manager 115 sends a client identifier 221 and a client secret 222 to the device 110. The client identifier 221 is public and can be viewed by anyone, while the client secret 222 is private and is accessible only to the device 110.

At 225, the device 110 generates a public key and private key pair. In some examples, an application running on the device 110 generates the public key and private key pair. At 230, the device 110 creates a registration request that includes the public key of the device 110. One example of the registration request includes an authorization header with the client identifier 221 and the client secret 222. The registration request may further include fields or device attributes, such as device type and device unique identifier, for registering the device 110 with the device access manager 115.

The device access manager 115 has its own private public key pair. Messages sent to the device access manager 115 are encrypted with a manager public key. During the registration process 200, the device access manager 115 provides the manager public key to the device 110 in a message (not shown). In other examples, the manager public key is provided when the device 110 scans the QR code or is provided through the manager API. At 235, the device 110 encrypts the registration request with the manager public key to form an encrypted registration request 236 and sends it to the device access manager 115.

The device access manager 115 decrypts incoming messages with the manager private key. In this way, no other party can intercept and read messages beside the device access manager 115. At 240, the device access manager 115 decrypts the encrypted registration request 236 with its private key. At 245, the device access manager 115 registers device attributes, such as device type and device unique identifier, and stores the device public key, for example, in a registry. The registration process 200 ends at 250 with the device 110 registered to the device access manager 115 and connected to the user 105.

The device 110 encrypts data using its private key to form a device data encrypted file (DDEF). The data can be any form of data ranging from client credentials to binary files. Data is encrypted on the device 110 itself and distributed as encrypted data or messages. Because the data is encrypted with a device private key, the encrypted data is unique to the device 110 itself. In a convenient example, the device 110 encrypts the data using any one of a number of standard cryptography techniques, such as Digital Signature Algorithm (DSA), RSA, and Elliptic Curve Digital Signature Algorithm (ECDSA) just to name a few. The device 110 then signs the DDEF with its digital certificate. In embodiments, device 110 may encrypt data using its public key to form a DDEF intended for access by the same device 110 that is encrypting the file. To decrypt the file encrypted by device 110 using its own public key, the device 110 may use its own private key paired to the public key.

The digital certificate is the digital equivalent of a physical or paper certificate. Just as a physical license serves to identify an individual and show what they are allowed to do, e.g. a driver's license identifies someone who can legally drive. The digital certificate is presented to prove the identity of the device 110 and its right to access certain information on the device access manager 115. Examples of the digital certificate include X.509 certificate.

The digital certificate is used to ensure that the DDEF passed from device 110 to the device access manager 115 originated from the device 110. The device access manager 115 checks a digital certificate associated with a DDEF to verify the identity of a device sending the DDEF. If the check fails, the device access manager 115 does not allow or discards the DDEF. Advantageously, this inhibits unauthorized devices or devices posing as authorized devices from sending data to other devices and comprise security. In some examples, for extra security measures, the device access manager 115 checks the DDEF using the digital certificate to verify the integrity of the DDEF and to ensure that it was not altered in transit.

In some examples, the device 110 stores the DDEF in a data store that is external to the device 110. The device 110 encrypts the DDEF with the public key of the device access manager 115 before storing the DDEF in the data store. A convenient example of the data store provides one or more of the following features: 1) deny access to device based on current user settings, 2) encrypt DDEF with a private key of the data store, and 3) back up and secure the data store from a variety of attacks using industry standards. In other examples, the device 110 stores the DDEF to a cloud storage solution (e.g., AMAZON CLOUD DRIVE, MICROSOFT ONEDRIVE, and GOOGLE DRIVE) or any other storage system. In a convenient example, an application running on the device 110 performs the foregoing, automatically, with little or no interaction from the user 105. The data may be stored in the data store and encrypted with one or more public keys of additional devices, or device 110, such that the data may be accessed by any device having a paired private key to the encrypted data. In other words, device 110 may grant access to other devices by encrypting the data with the public key of the accessing device(s) and allowing device manager 115 to transmit the data to the accessing device(s), or allowing the accessing device(s) direct access to the data store. Each accessing device then uses their corresponding private key to decrypt the data intended for them.

Figure 3:
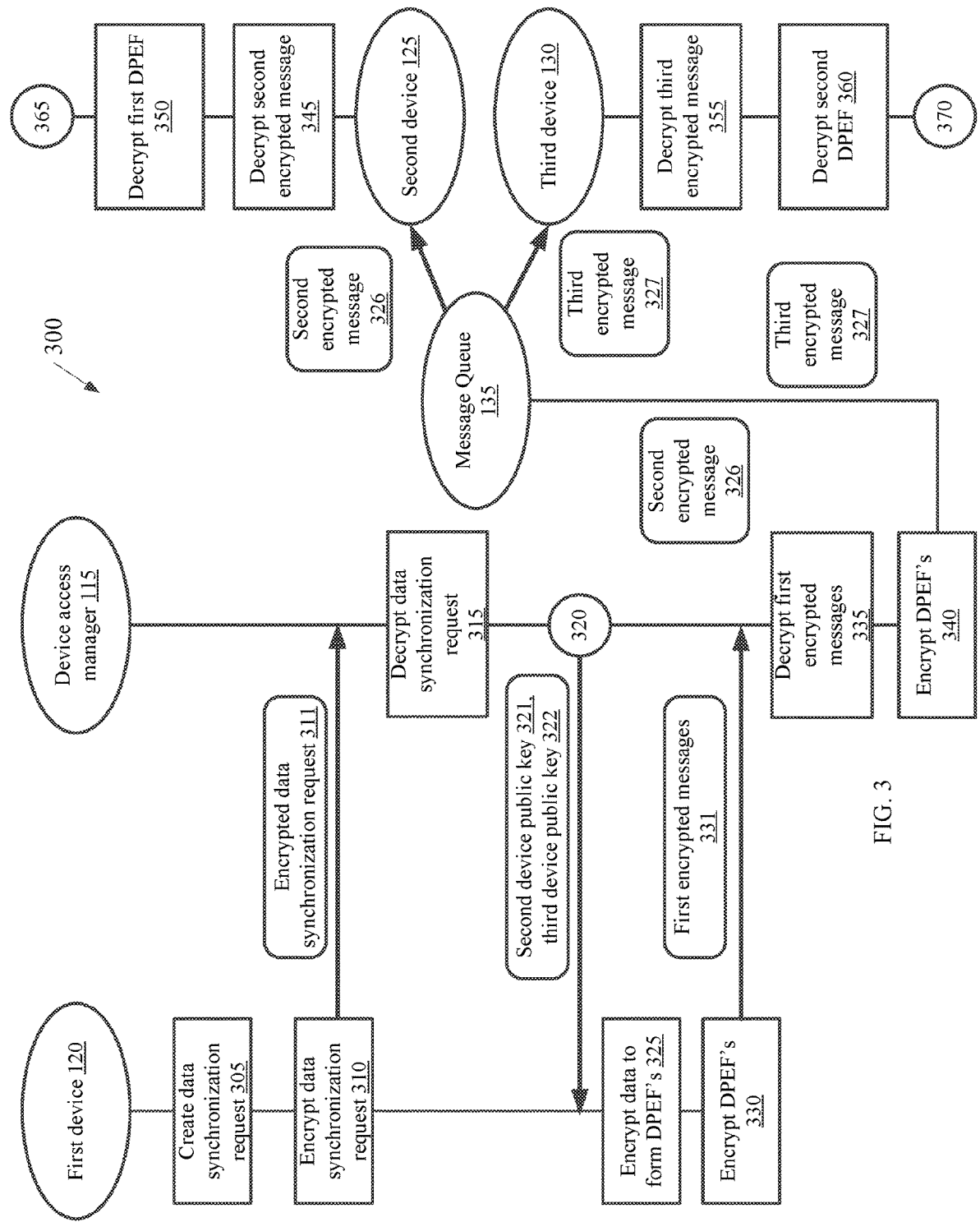
FIG. 3 is a diagram of an example of a data synchronization process, in an embodiment.

FIG. 3 shows an example of the data synchronization process 300 in which a first device 120 synchronizes data with a second device 125 and a third device 130. This is particularly useful when a user has several devices and it's desirable that all the devices have the same data. When the data changes on one device, the change is propagated to the other devices. It should be readily apparent that the data synchronization process 300 can synchronize data with any number of devices including two (e.g., the first device 120 and the second device 125).

At 305, the first device 120 creates a data synchronization request for public keys of the second device 125 and the third device 130. At 310, the first device 120 encrypts the data synchronization request with the public key of the device access manager 115 and signs it to form an encrypted data synchronization request 311.

At 315, the device access manager 115 decrypts the encrypted data synchronization request 311. In response, at 320, the device access manager 115 sends public keys of the second device 125 and the third device 130, referenced as 321 and 322, respectively. At 325, the first device 120 encrypts the data with the second device public key 321 to form a first DPEF and encrypts the data with the third device public key 322 to form a second DPEF. It should be readily apparent that the foregoing at 325 is repeated for as many public keys as the first device 120 device received, and thus producing a same number of DPEF's.

At 330, the first device 120 encrypts the first and second DPEF's with the public key of the device access manager 115 and signs it to form a first encrypted message 331 for the second device 125 and the third device 130. Each of the first encrypted messages 331 is identified (e.g., in a message header) with a recipient of the message. At 335, the device access manager 115 decrypts the encrypted first encrypted messages 331 and determines (e.g., from a message header) that the recipient of the first DPEF is the second device 125 and the recipient of the second DPEF is the third device 130.

At 340, the device access manager 115 encrypts the first DPEF with the second device public key 321 to form a second encrypted message 326. The device access manager 115 encrypts the second DPEF with the third device public key 322 to form a third encrypted message 327. The second encrypted message 326 and the third encrypted message 327 are in a message queue 135. The second device 125 and the third device 130 "listen" to the message queue 135 for encrypted messages. In one example, the second device 125 and the third device 130 request or query the message queue 135 for encrypted messages intended for them. In another example, the message queue 135 pushes encrypted messages to the second device 125 and the third device 130.

At 345, the second device 125 decrypts the second encrypted message 326 with its private key to reveal the first DPEF. By decrypting at 345, the second device 125 also checks the identity of the device access manager 115 and identifies the intention of the second encrypted message 326. The intention of a message instructs a device what to do with the message or how to process the message. For example, when the intention of a message is a request to synchronize data, a device is instructed to store decrypted data. In another example, when the intention of a message is a request for access, a device will first ask a user of the device to confirm access. In some examples, the intention of a message is encoded or other specified in a message header.

Continuing with the example of FIG. 3, the intention of the second encrypted message 326 is to synchronize data. The second device 125 stores the data after decrypting the first DPEF. At 350, the second device 125 decrypts the first DPEF with its private key to reveal the data. At 355, the third device 130 similarly decrypts the third encrypted message 327 with its private key to reveal the second DPEF. By decrypting at 355, the third device 130 also checks the identity of the device access manager 115 and identifies the intention of the message, which in this case, is a request to synchronize data. The third device 130 stores the data after decrypting the second DPEF. At 360, the third device 130 decrypts the second DPEF with its private key to reveal the data.

The second device 125 and the third device 130 then encrypt the data with their respective private keys to form device data encrypted files or DDEF's and store the encrypted DDEF in their data store, as described above. The data synchronization process 300 ends at 365 and 370 with the data synchronized among the first device 120, the second device 125, and the third device 130.

Figure 4:
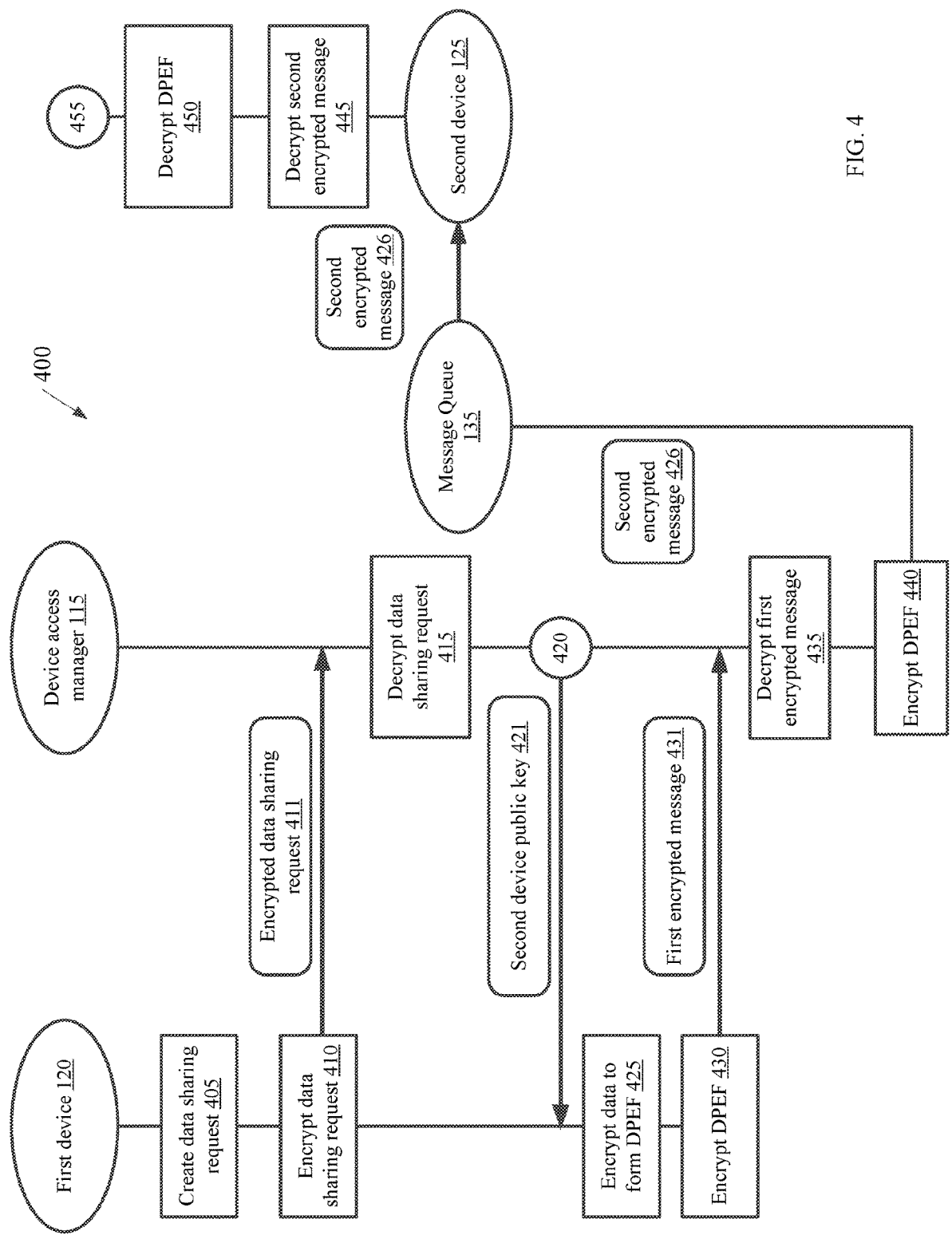
FIG. 4 is a diagram of example of a data sharing process, in an embodiment.

FIG. 4 shows an example of the data sharing process 400 in which the first device 120 shares data with the second device 125. At 405, the first device 120 creates a data synchronization request for a public key of the second device 125. At 410, the first device 120 encrypts the data sharing request with the public key of the device access manager 115 and signs it to form an encrypted data sharing request 411.

At 415, the device access manager 115 decrypts the encrypted data sharing request 411. In response, at 420, the device access manager 115 sends a public key of the second device 125, referenced as 421. At 425, the first device 120 encrypts the data with the second device public key 421 to form a DPEF.

At 430, the first device 120 encrypts the DPEF with the public key of the device access manager 115 and signs it to form a first encrypted message 431. At 435, the device access manager 115 decrypts the first encrypted message 431 and determines the DPEF is intended for the second device 125. At 440, the device access manager 115 encrypts the DPEF with the second device public key 421 to form a second encrypted message 426. The second encrypted message 426 is in the message queue 135. The second device 125 queries the message queue 135 for encrypted messages. In another example, the message queue 135 pushes encrypted messages to the second device 125.

At 445, decrypts the second encrypted message 426 with its private key to reveal the DPEF. By decrypting at 445, the second device 125 also checks the identity of the device access manager 115 and identifies the intention of the message is to share data. At 450, the second device 125 decrypts the DPEF with its private key to reveal the data. The data sharing process 400 ends at 455 with the data shared among the first device 120 and the second device 125. The second device 125 can then encrypt the data with its private key to form a device data encrypted file or DDEF and store the encrypted DDEF in the data store, as described above.

Examples of the registration process 200, the data synchronization process 300, and the data sharing process 400 may be carried out by one or more of the following described below.

Examples of the device 110 (of FIG. 2), and the first device 120, the second device 125, and the third device 130 (of FIG. 3) include a physical device, such as smart phone or a watch, or can be software acting as a device. In some examples, to register a device with the device access manager 115, the user 105 provides a type of the device, a name of the device, and a device unique identifier like a media access control (MAC) address or some other unique identifier. Upon registering, the device access manager 115 provides the device with a client identifier (e.g., the client identifier 221 of FIG. 2) and a client secret (e.g., the client secret 222 of FIG. 2). This pair is used by the device to authenticate itself with the device access manager 115. A convenient example of the device is configured to provide and maintain a public key that is stored in the device access manager 115.

Some examples of the device access manager 115 provide the user 105 with a webpage or dashboard so they can see all their devices registered with the device access manager 115. Examples of the manager webpage allow the user 105 to remove or deregister a device from the device access manager 115. Further examples of the manager webpage allowed the user 105 or administrator to view access log for a device and to manage access for a device.

Concerning access to data, in some examples, the user 105 can setup or otherwise configure a device to access only parts of the data. For example, a device can only access user information or a device can only store a specific type of data. Such access to data can be defined in a rule or access policy. In a convenient example of the registration process 200, in authorizing a device, the device access manager 115 decides to allow or not allow the device access data based on an access policy.

Some examples of the device access manager 115 decide whether to provide data or not based a voting system. In one instance, the user 105 setups an access policy in such way that they must verify each data exchange. In this way, the user 105 is always asked to verify access to data and the device access manager 115 abstain from voting.

Depending on the intention of a message, a user can setup rules so that their device alerts them to interact through an interface of the device. For example, when the intention of a message is to request synchronize or share data, the user's device alerts them to confirm the data sharing or syncing. Examples of the alert include a mobile notification or an alarm clock that asks the user to stop ringing.

In another instance, the user 105 give rights to the device access manager 115 to always respond with a positive confirmation. In this case, the device access manager 115 confirms that a device can receive data. The device access manager 115 then additionally encrypts the data with the device public key, signs it, and creates a message for the device on the message queue 135.

A convenient example of the device 110 (of FIG. 2), and the first device 120, the second device 125, and the third device 130 (of FIG. 3) include device software for generating of a private and public key pair, an API for interacting with the device access manager 115, an encryption and decryption mechanism, an application programming interface (API) for storing and retrieving encrypted data, and a message queue client. In addition to the foregoing, some devices have a means of representing their location to the device access manager 115.

As described above with reference to FIG. 4, the user 105 shares its data with other users through the device access manager 115. A convenient example of the device access manager 115 internally shares a pointer to the user's data with other users. In this manner, no actual data is shared, only information that data is shared with another user. This information can also hold an access policy. Access policy examples include whether a devices has access to data or access to certain types of data. Examples can vary from allowing immediate access, allowing access only once, allowing access in time interval, asking user for confirmation, etc.

In operation, when a device asks another device to share data, the device access manager 115 checks the access policy for the requesting device. If all is good, the device access manager 115 creates a sharing data request message for other devices to respond with the requested data. The device access manager 115 creates the message by encrypting the request (which itself may be encrypted) with device public keys of the other devices and by signing the encrypted message.

The first device or responding device that finds the encrypted message reserves the encrypted message for itself, so that none of the other devices process the encrypted message, thereby conserving computing resources. The responding device checks that the encrypted message came from device access manager 115. This is useful for inhibiting activity from unauthorized devices. The responding device then decrypts the message with its private key.

The responding device then issues a request to a data store to retrieve the requested data. The responding device decrypts the retrieved data with its private key. At this point, the responding device has the data asked for by the requesting device. The responding device processes the requested data according the intention (instruction) of the sharing data request message, viz., to share data with the requesting device. The responding device encrypts the processed data with the public key of the requesting device, signs it, and encrypts it with the manager public key. The encrypted message is then on the message queue 135 for the requesting device to retrieve.

Some examples of the device software use proximity of a device to other devices to register the device with the device access manager 115, in accordance with examples of the registration process 200 of FIG. 2. Device proximity is determined based on geolocation, sharing a Bluetooth connection, being on a same WI-FI network, or any other means available in the industry. Device proximity can also be used to open a door for someone or to sign someone in, digitally.

For example, an employee must enter in their credentials to open an electronic door at work. The employee's smartphone and the electronic door are configured to share the employee's credential according to an example of the data sharing process 400 of FIG. 4. When the employee carrying their smartphone comes near the electronic door (i.e., within proximity to each other), the smartphone shares the employee's credentials with the electronic door. Once the sharing process is complete and the employee's credentials are checked, the electronic door opens letting in the employee. The time when the employee entered can also be tracked.

Examples of the device software include one or more of following features: generate device public/private key pair, hold trusted public keys (to minimize requests to the device access manager 115 for device public keys) along with manager public key (used for securing communication between device and the device access manager 115), encrypt and decrypt data, implement an API in order to communicate with the device access manager 115, and hold information on all data storage systems, so it can send data and request data from the data store.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

It should be appreciated that various features discussed herein may be included or omitted depending on the specific embodiment. As such, reordering of steps, or combination of any of the features discussed herein is expressly acknowledged unless expressly stated otherwise. As an example, the below combination of features may be implemented in various embodiments:

(A1) In a first aspect, a method for securely exchanging data between devices, the method includes registering a plurality of devices with a device access manager storing device public keys for each of the plurality of devices.

(A2) In the method denoted above as (A1), the method may further include, from a first of the plurality of devices, transmitting a data synchronization request to the device access manager requesting a second device public key of the device public keys associated with a second of the plurality of devices.

(A3) In either of the methods denoted above as (A1)-(A2), the method may further include encrypting the data with the second device public key to form a device public encrypted file (DPEF) to be transmitted to the second device.

(A4) In any of the methods denoted above as (A1)-(A3), the method may further include encrypting the DPEF with a manager public key to form an encrypted message for synchronizing the data among the first and second devices.

(A5) In any of the methods denoted above as (A1)-(A4), the method may further include, at the device access manager, decrypting the first encrypted message with a manager private key paired to the manager public key.

(A6) In the method denoted above as (A6), the method may further include, at the device access manager, encrypting the DPEF as a second encrypted message with the second device public key for the second device.

(A7) In any of the methods denoted above as (A1)-(A6), the method may further include, transmitting the second encrypted message to the second device.

(A8) In the method denoted above as (A7), the step of transmitting the second encrypted message may include pushing the second encrypted message to the second device.

(A9) In either of the methods denoted above as (A7)-(A8), the step of transmitting the second encrypted message including transmitting the second encrypted message in response to a request from the second device.

(A10) In any of the methods denoted above as (A1)-(A9), the method may further include, at the second device, decrypting the second encrypted message with a second device private key paired to the second device public key to obtain the encrypted DPEF; and, (A11) In any of the methods denoted above as (A1)-(A10), the method may further include, at the second device, decrypting the DPEF with the second device private key to obtain the data.

(A12) In any of the methods denoted above as (A1)-(A11), the method may further include, the step of transmitting the data synchronization request including requesting at least one additional device public key associated respectively with at least one additional device.

(A13) In any of the methods denoted above as (A1)-(A12), the method may further include, the step of encrypting the data including forming the DPEF as a plurality of DPEFs each encrypted respectively with one of the second device public key and the at least one additional device public key.

(A14) In any of the methods denoted above as (A1)-(A13), the method may further include, the step of encrypting the DPEF as a second encrypted message including encrypting the plurality of DPEFs as an additional encrypted message for each of the at least one additional devices.

(A15) In any of the methods denoted above as (A1)-(A14), the method may further include, the data being a password for accessing an application.

(A16) In the method denoted above as (A15), the method further comprising accessing the application via the second device based on the data obtained during the step of decrypting the DPEF.

(A17) In any of the methods denoted above as (A1)-(A16), the method may further include, the data being data to be synchronized between the first and at least one additional device.

(A18) In the method denoted above as (A17), the method further including storing the data obtained during the step of decrypting the DPEF on a data store coupled with the second device.

(A19) In any of the methods denoted above as (A1)-(A18), the data being encrypted in accordance to a cryptography technique selected from the group consisting of Digital Signature Algorithm (DSA), RSA, and Elliptic Curve Digital Signature Algorithm (ECDSA).

(A20) In any of the methods denoted above as (A1)-(A19), the step of transmitting the data synchronization request including encrypting the data synchronization request with the manager public key.

(A21) In any of the methods denoted above as (A1)-(A20), the method further including encrypting the data with a first private key of the first device to form a device data encrypted file (DDEF).

(A22) In the method denoted above as (A21), the method further including storing the DDEF in a data store that is external to the first device and includes the data encrypted with one or more second private keys.

(A23) A system implementing the methods denoted above as (A1)-(A22), the system including one or more of a device access manager, the first device, the second device, and any number of additional devices of a plurality of devices registered with the device access manager.

(B1) In a second aspect, a method includes: in a device access manager including one or more device public keys, registering a plurality of devices.

(B2) In the method denoted above as (B1), the method may further include decrypting a data synchronization request received from a first device of the plurality of devices requesting at least one device public key associated respectively with at least one additional device of the plurality of devices.

(B3) In either of the methods denoted above as (B1) or (B2), the method may further include transmitting the at least one device public key to the first device.

(B4) In any of the methods denoted above as (B1)-(B3), the method further including decrypting a first encrypted message received from the first device, the first encrypted message encrypted based on a manager public key associated with the device manager, and including at least one device public encrypted file (DPEF) each respectively encrypted according to the at least one device public key, each DPEF including data from the first device.

(B5) In any of the methods denoted above as (B1)-(B4), the method further including encrypting the at least one DPEF respectively with the at least one device public keys to form at least one second encrypted messages each respectively intended for one of the additional devices.

(B6) In any of the methods denoted above as (B1)-(B5), the method further including generating a message queue with the at least one second encrypted message for synchronizing the data among the first and at least one additional devices.

(B7) In any of the methods denoted above as (B1)-(B6), the step of registering the first device including: providing credentials to the first device.

(B8) In the method denoted above as (B7), the step of registering the first device including decrypting a registration request from the first device, the registration request includes the credentials and a first device public key, and is encrypted with the manager public key.

(B9) In either method denoted above as (B7)-(B8), the step of registering the first device including storing the first device public key in the device access manager.

(B10) In any of the methods denoted above as (B6)-(B9), the step of generating the message queue including pushing the at least one second encrypted message to the at least one additional device.

(B11) In any of the methods denoted above as (B6)-(B10), the step of generating the message queue including transmitting the at least one second encrypted message to the at least one additional device in response to a request from each of the at least one additional device.

(B12) A system implementing the methods denoted above as (B1)-(A12), the system including one or more of a device access manager, the first device, the second device, and any number of additional devices of a plurality of devices registered with the device access manager.

(C1) In a third aspect, a system for securely exchanging data between devices includes a device access manager storing a manager public key associated with the device access manager and a plurality of device public keys associated with a plurality of devices registered and communicatively coupled with the device access manager, respectively.

(C2) In the system denoted above as (C1), a first of the plurality of devices may be configured to transmit, to the device access manager, a data synchronization request encrypted with the device manager public key requesting at least one of the device public keys associated with respective at least one additional devices of the plurality of devices.

(C3) In either of the systems denoted above as (C1)-(C2), a first of the plurality of devices may be configured to encrypt data with the at least one device public key to form respective device public encrypted files (DPEF) for each of the at least one additional device.

(C4) In any of the systems denoted above as (C1)-(C3), a first of the plurality of devices may be configured to encrypt the DPEF's with the manager public key to form a first encrypted message.

(C5) In any of the systems denoted above as (C1)-(C4), the device access manager may be configured to decrypt the data synchronization request.

(C6) In any of the systems denoted above as (C1)-(C5), the device access manager may be configured to transmit the at least one device public key to the first device.

(C7) In any of the systems denoted above as (C1)-(C6), the device access manager may be configured to decrypt the first encrypted message to reveal the DPEF's for each of the at least one additional device.

(C8) In any of the systems denoted above as (C1)-(C7), the device access manager may be configured to encrypt the received DPEF's with the at least one public keys to form a respective a least one additional encrypted message for each of the at least one additional device.

(C9) In any of the systems denoted above as (C1)-(C8), the device access manager may be configured to generate a message queue with the at least one additional second encrypted message.

(C10) In any of the systems denoted above as (C1)-(C9), the at least one additional device may be configured to decrypt the respective additional message.

(C11) In any of the systems denoted above as (C1)-(C10), the at least one additional device may be configured to decrypt the DPEF's to reveal the data, thereby synchronizing the data among the first and at least one additional device.

(C12) In any of the systems denoted above as (C1)-(C11), the data being a password for accessing an application.

(C13) In the method denoted above as (C12), the at least one additional device being further configured to access the application using the at least one additional device based on the decrypted DPEF.

(C14) In any of the systems denoted above as (C1)-(C13), the data being data to be synchronized between the first and at least one additional device.

(C15) In the method denoted above as (C14), the at least one additional device being further configured to store the data obtained via the decrypted DPEF on a data store coupled with the respective at least one additional device.

(C16) A method as implemented by any of the systems denoted above as (C1)-(C15).

What is claimed is:

1. A method for securely exchanging data between first and second devices, comprising:
    storing a public key, for each of the first and second devices, in a device access manager;
    receiving, at the device access manager, a data synchronization request from the first device requesting the public key of the second device;
    receiving, from the first device, a first encrypted message formed by encrypting the data with the public key of the second device to form a device public encrypted file (DPEF) and encrypting the DPEF with a public key of the device access manager;
    decrypting the first encrypted message with a private key of the device access manager, paired with the public key of the device access manager, to obtain the DPEF;
    encrypting the DPEF with the public key of the second device to form a second encrypted message; and
    transmitting the second encrypted message from the device access manager to the second device.

2. The method of claim 1,
    wherein the second encrypted message is decryptable using a private key of the second device, paired with the public key of the second device, to obtain the DPEF; and
    wherein the DPEF is decryptable using the private key of the second device to obtain the data.

3. The method of claim 2, wherein the data synchronization request is encrypted by the public key of the device access manager, the method further comprising:
    decrypting the data synchronization request with the private key of the device access manager; and
    transmitting the public key of the second device from the device access manager to the first device.

4. The method of claim 3, further comprising registering the first and second devices with the device access manager by:
    creating a first identity for the first device in response to receiving a username and a password from the first device;
    creating a second identity for the second device in response to receiving a username and a password from the second device;
    sending a first client identifier and a first client secret to the first device based on the first identity;
    sending a second client identifier and a second client secret to the second device based on the second identity;
    decrypting a registration request from the first device to obtain the public key, client identifier, and client secret of the first device; and
    decrypting a registration request from the second device to obtain the public key, client identifier, and client secret of the second device.

5. The method of claim 4,
    further comprising:
        encrypting the first client secret with the public key of the first device to generate an encrypted first client secret; and
        encrypting the second client secret with the public key of the second device to generate an encrypted second client secret;
    wherein:
        sending the first client secret to the first device includes sending the encrypted first client secret to the first device; and sending the second client secret to the second device includes sending the encrypted second client secret to the second device.

6. The method of claim 4, the data being a password for accessing an application, the method further comprising accessing the application by the second device using the password.

7. The method of claim 2, the method further comprising:
storing a public key of a third device in the device access manager; and
wherein the data synchronization request includes a request for the public key of the third device;
receiving an additional first encrypted message from the first device, the additional first encrypted message comprising data encrypted with the public key of the third device to form a second DPEF, and the second DPEF being encrypted with the the public key of the device access manager;
decrypting the additional first encrypted message with the private key of the device access manager to obtain the second DPEF;
encrypting the second DPEF with the public key of the third device to form a third encrypted message; and
transmitting the third encrypted message from the device access manager to the third device.

8. The method of claim 7,
the third encrypted message being decryptable by a private key of the third device, paired with the public key of the third device, to obtain the second DPEF; and
the second DPEF being decryptable by the private key of the third device to obtain the data.

9. The method of claim 8, wherein
each first encrypted message prior to transmitting to the device access manager; and
each first encrypted message is authenticated by checking a digital certificate.

10. A method for securely exchanging data between first, second, and third devices, comprising:
storing a public key of each of the first, second, and third devices in a device access manager;
decrypting a data synchronization request, received from the first device, requesting the public keys of the second and third devices;
transmitting the public keys of the second and third devices to the first device;
decrypting first encrypted messages, received from the first device, to obtain a first device public encrypted file (DPEF) having data encrypted with the public key of the second device, and a second DPEF having data encrypted with the public key of the third device;
encrypting the first DPEF with the public key of the second device to form a second encrypted message;
encrypting the second DPEF with the public key of the third device to form a third encrypted message;
transmitting the second encrypted message to the second device; and
transmitting the third encrypted message to the third device.

11. The method of claim 10, further comprising registering each of the first, second, and third devices by:
creating an identity for said each device in response to receiving a username and a password from said each device;
sending a client identifier and a client secret to said each device based on the identity; and
decrypting a registration request from said each device to obtain the public key, client identifier, and client secret of said each device.

12. The method of claim 10,
the transmitting the second encrypted message to the second device occurring in response to a request from the second device; and
the transmitting the third encrypted message to the third device occurring in response to a request from the third device.

13. The method of claim 10, further comprising checking a digital certificate to authenticate each of the first encrypted messages.

14. A system for securely exchanging data between a first device and a second device, comprising:
a device access manager storing (a) a private key of the device access manager, and (b) one public key for each of the first and second devices communicatively coupled with the device access manager;
the device access manager being configured to:
decrypt, with the private key of the device access manager, a data synchronization request received from the first device requesting the public key of the second device;
transmit the public key of the second device to the first device; and
decrypt, with the private key of the device access manager, a first encrypted message received from the first device to obtain a device public encrypted file (DPEF) having data encrypted with the public key of the second device;
encrypt the DPEF with the public key of the second device to form a second encrypted message;
transmit the second encrypted message to the second device.

15. The system of claim 14, further comprising the first and second devices, wherein:
the first device is configured to:
transmit the data synchronization request to the device access manager;
encrypt the data with the public key of the second device to form the DPEF;
encrypt the DPEF with a public key of the device access manager to generate the first encrypted message, the public key of the device access manager being paired with the private key of the device access manager; and
transmit the first encrypted message to the device access manager; and
the second device is configured to:
decrypt, with a private key of the second device, the second encrypted message received from the device access manager to obtain the DPEF, the private key of the second device being paired with the public key of the second device; and
decrypt the corresponding DPEF with the private key of the second device to obtain the data.

16. The system of claim 15, the data being a password for accessing an application, the second device being further configured to access the application with the password.

17. The system of claim 15, the second device being further configured to store the data on a data store coupled with the second device.

* * * * *